United States Patent
Vickers (10) Patent No.: US 6,202,456 B1
(45) Date of Patent: Mar. 20, 2001

(54) ANTI-THEFT DEVICE FOR VEHICLES

(75) Inventor: Robert V. Vickers, Chagrin Falls, OH (US)

(73) Assignee: Winner International Royalty LLC, Sharon, PA (US)

( * ) Notice: Subject to any disclaimer, the term of this patent is extended or adjusted under 35 U.S.C. 154(b) by 0 days.

(21) Appl. No.: 09/506,884

(22) Filed: Feb. 18, 2000

(51) Int. Cl.⁷ ............................................. F16H 57/00
(52) U.S. Cl. ............................ 70/202; 70/201; 70/237
(58) Field of Search ........................... 70/198–204, 209, 70/237, 238

(56) References Cited

U.S. PATENT DOCUMENTS

| | | |
|---|---|---|
| 2,330,536 | 9/1943 | Zimmerman . |
| 4,493,198 | 1/1985 | Brown . |
| 4,779,435 | 10/1988 | Farrow . |
| 4,856,308 | 8/1989 | Johnson . |
| 5,040,387 | 8/1991 | Knott, Jr. . |
| 5,267,458 | 12/1993 | Heh . |
| 5,282,373 | 2/1994 | Riccitelli . |
| 5,345,796 | 9/1994 | Chieh et al. . |
| 5,537,846 | 7/1996 | Simon . |
| 5,653,133 | 8/1997 | Passantino . |
| 5,704,233 | 1/1998 | Farshad . |
| 5,715,710 | 2/1998 | DeLucia et al. . |
| 5,870,912 | 2/1999 | Vito . |
| 5,881,587 | 3/1999 | Vito . |
| 5,911,765 * | 6/1999 | DaSilva .............................. 70/237 X |
| 5,950,463 * | 9/1999 | Glazier et al. ..................... 70/237 X |
| 5,979,197 | 11/1999 | Mellini et al. . |
| 6,006,559 * | 12/1999 | Hsu ....................................... 70/202 |
| 6,029,483 * | 2/2000 | Daniels ............................. 70/202 X |

FOREIGN PATENT DOCUMENTS

2255060 * 10/1992 (GB) ................................... 70/202

* cited by examiner

Primary Examiner—Suzanne Dino Barrett
(74) Attorney, Agent, or Firm—Vickers, Daniels & Young (57) ABSTRACT

An anti-theft device for locking the foot pedal of a vehicle against depression toward the underlying floorboard of the vehicle comprises a base for engaging the floorboard beneath the foot pedal, a tubular body extending upwardly from said base and having an upper end spaced above the pedal arm and a slot extending from the base toward the upper end, a locking rod slidably received in the tubular body and having a hook extending outwardly through the slot and providing an upwardly open recess with said body for receiving the foot pedal arm, and a key operated lock for releasably holding the locking rod in a position relative to the tubular body in which the hook precludes displacement of the foot pedal toward the floorboard.

8 Claims, 7 Drawing Sheets

ANTI-THEFT DEVICE FOR VEHICLES

BACKGROUND OF THE INVENTION

This invention relates to the art of anti-theft devices for vehicles and, more particularly, to an improved vehicle foot pedal locking device.

A wide variety of anti-theft devices have been provided heretofore which are operable to lock or otherwise position a foot pedal of a vehicle relative to the underlying floor board of the vehicle, thus to render the pedal inoperable in connection with driving the vehicle. Some such devices lock the foot pedal lever in a depressed position relative to the floorboard as shown, for example, in U.S. Pat. No. 5,040,387 to Knott and U.S. Pat. No. 5,345,796 to Chieh, et al. Another approach has been to lock the foot pedal lever in its released position by a device having hooks or the like on its opposite ends for engaging the vehicle steering wheel and foot pedal lever as shown, for example, in U.S. Pat. No. 4,779,435 to Farrow, U.S. Pat. No. 5,267,458 to Heh, U.S. Pat. No. 5,653,133 to Bassanitino, and U.S. Pat. No. 5,740,233 to Farshad. It has also been proposed as shown in U.S. Pat. No. 4,493,198 to Brown to clamp a block on a vehicle foot pedal lever such that the block engages the underlying floorboard to preclude sufficient depression of the foot pedal to enable its intended operation. Still another approach has been to provide a device including a base engaged against the floorboard of a vehicle, or otherwise secured in a fixed position relative thereto, and which base supports a member adapted to engage under the foot pedal or pedal lever and lock the latter in its released position and thus against the depression necessary for operation thereof in connection with driving the vehicle. Devices of this type are shown, for example, in U.S. Pat. No. 2,330,536 to Zimmermann, U.S. Pat. No. 5,282,373 to Riccitelli, U.S. Pat. No. 5,537,846 to Simon, 5,715,710 to DeLucia, U.S. Pat. No. 5,870,912 to Vito, and U.S. Pat. No. 5,881,587 to Vito.

While anti-theft devices of the foregoing character are operable for their intended purpose, there are a number of problems and disadvantages attendant to the manufacturer and/or use thereof. More particularly in this respect, some of the devices are difficult to mount and dismount relative to a vehicle foot pedal, particularly those which require the operator to crouch down or reach in from outside the vehicle so as to have access to the foot pedal lever for mounting the anti-theft device thereon or between the latter and another structural element in the vehicle. Others of the devices are structurally complex and therefor expensive to manufacture and/or cumbersome to manipulate in connection with the mounting and dismounting thereof in a vehicle and/or are massive with respect to the length and width dimensions thereof which not only adds to the difficulty in handling thereof during mounting and dismounting but also presents a problem with respect to the storage area therefor. Still others of the devices are susceptible to being easily removed by a thief sawing or cutting through a component thereof.

Of the devices shown in the foregoing groups of patents which can be mounted and dismounted by a vehicle operator sitting in the driver's seat of the vehicle, namely those connected between the foot pedal and steering wheel of the vehicle and those engaged on the floorboard beneath the foot pedal and engaging under the foot pedal lever to lock the latter in the released position thereof, the latter devices of the character shown in the DeLucia and Vito patents have the advantage of being dimensionally shorter and thus requiring less storage space and the advantage of being independent of the steering wheel of a vehicle which can be readily severed by an expert car thief so as to separate the anti-theft device from the steering wheel and foot pedal. Even so, such devices heretofore available are difficult to manipulate with respect to mounting and dismounting thereof from the foot pedal lever of a vehicle and, additionally, while shorter axially than the devices connecting a foot pedal lever and steering wheel, are not dimensionally compact laterally with respect to the opposite ends thereof and, therefore, still present a problem with respect to storage space. In particular in this respect, the device in DeLucia requires manual rotation of a shaft to bring clamping members into engagement with a brake pedal lever, whereby the mounting and dismounting is both cumbersome and time consuming. In the Vito devices, the base and housing portion thereabove have to be elevated relative to the floor board to enable the passage of the foot pedal lever laterally into alignment with the slot in the housing, after which the base is lowered to the floorboard and the mounting completed by displacing the locking component relative to the housing. Again, manipulation of the device to achieve alignment of the foot pedal lever with the entrance to the slot and the subsequent lowering of the base onto the floorboard is cumbersome and time consuming. Moreover, the outer leg of the housing is channel-shaped in cross section and can be sawed through by a thief and removed from the remainder of the housing. This eliminates the slot whereby the device can be displaced laterally of the pedal lever and removed in that the locking component alone does not capture the pedal lever.

SUMMARY OF THE INVENTION

An improved vehicle anti-theft device of the character having a base engaging the floorboard of a vehicle beneath a foot pedal thereof and a component for engaging under the foot pedal lever and locking the foot pedal in its released position is provided in accordance with the present invention. More particularly in accordance with the invention, a vehicle anti-theft device of the foregoing character has a base and locking component structure which both simplifies the positioning of the device relative to the vehicle foot pedal lever and provides a hooking interengagement with the foot pedal lever which captures the latter to preclude unintended separation of the anti-theft device therefrom. Advantageously, minimal physical and/or manual manipulation is required to install and remove the device relative to such devices heretofore available. Further in accordance with the invention, the lateral dimension of the device relative to the opposite ends thereof is minimized and the structure and structural interrelationship between the component parts of the device is simplified, thereby optimizing both the size and weight of the device, promoting the ease of manipulating the device in connection with the mounting and dismounting thereof relative to a vehicle foot pedal and minimizing the storage space requirements therefor.

It is accordingly an outstanding object of the present invention to provide an improved vehicle anti-theft device of the character comprising a base for engaging the floorboard of a vehicle beneath a foot pedal thereof and components providing a hook configuration for engaging under and along the sides of the foot pedal lever to lock the foot pedal in the retracted or undepressed position thereof relative to the floorboard.

Another object is the provision of a vehicle anti-theft device of the foregoing character wherein the structure and structural interrelationship between the component parts of the device provides for ease of mounting and dismounting of the device relative to a vehicle foot pedal and optimizes protection against unintended removal when mounted.

Yet another object is the provision of a vehicle anti-theft device of the foregoing character in which the lateral dimensions of the device relative to the opposite ends thereof provides structural compactness and optimizes the space required for storage of the device.

A further object is the provision of a vehicle anti-theft device of the foregoing character in which the structural interrelationship between the component parts minimizes the effort and manipulative movements of parts required to mount and dismount the device relative to a vehicle foot pedal.

Still a further object is the provision of a vehicle anti-theft device of the foregoing character which is economical to produce, easy to manipulate into lock and unlocked conditions relative to a vehicle foot pedal, and efficient with respect to manipulating the component parts thereof for installation and removal relative to a vehicle foot pedal.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which.

DESCRIPTION OF PREFERRED EMBODIMENTS

Figure 1:
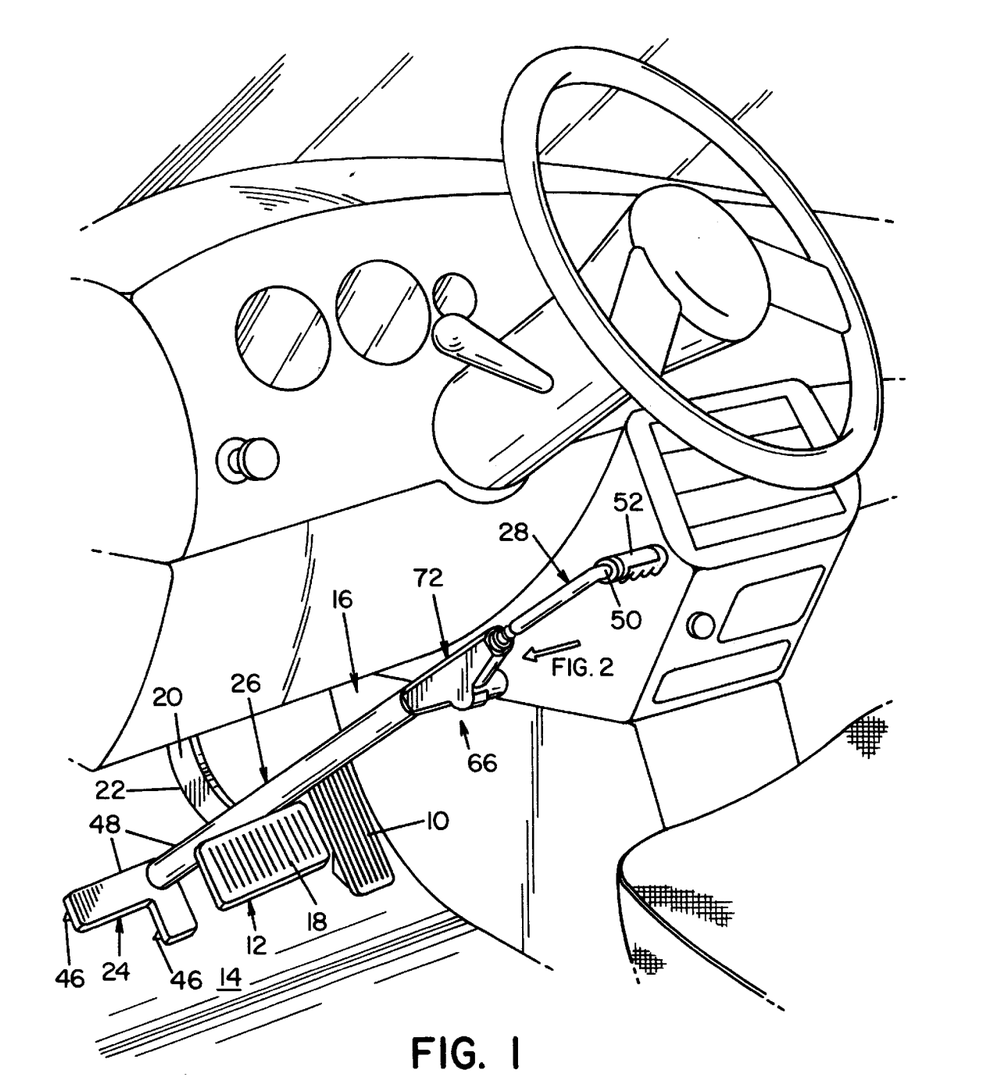
FIG. 1 is a perspective view of the interior of a motor vehicle showing an anti-theft device according to the invention installed relative to a foot pedal of the vehicle.
Figure 2:
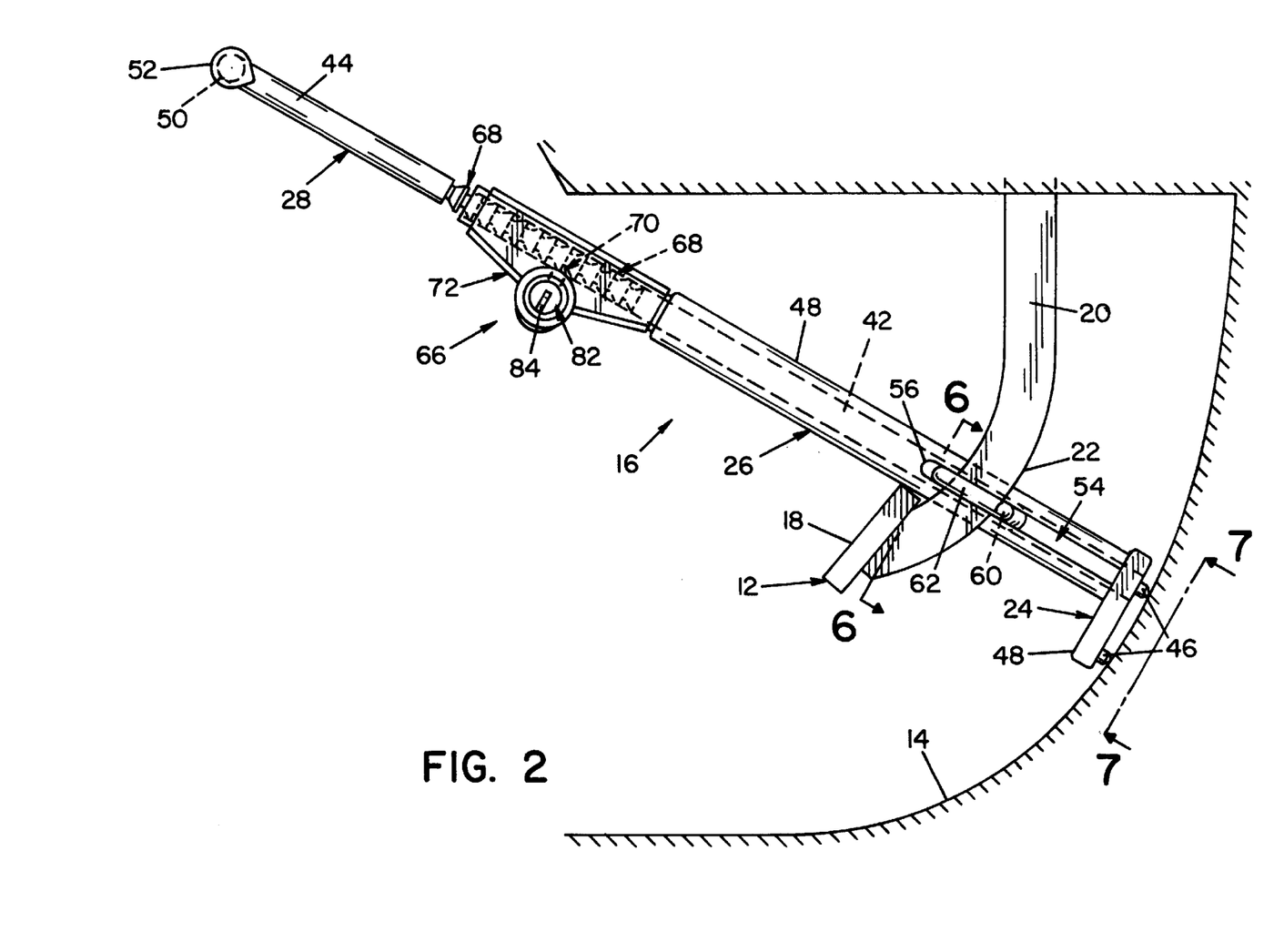
FIG. 2 is a side elevation view of the anti-theft device looking from right to left in FIG. 1.
Figure 3:
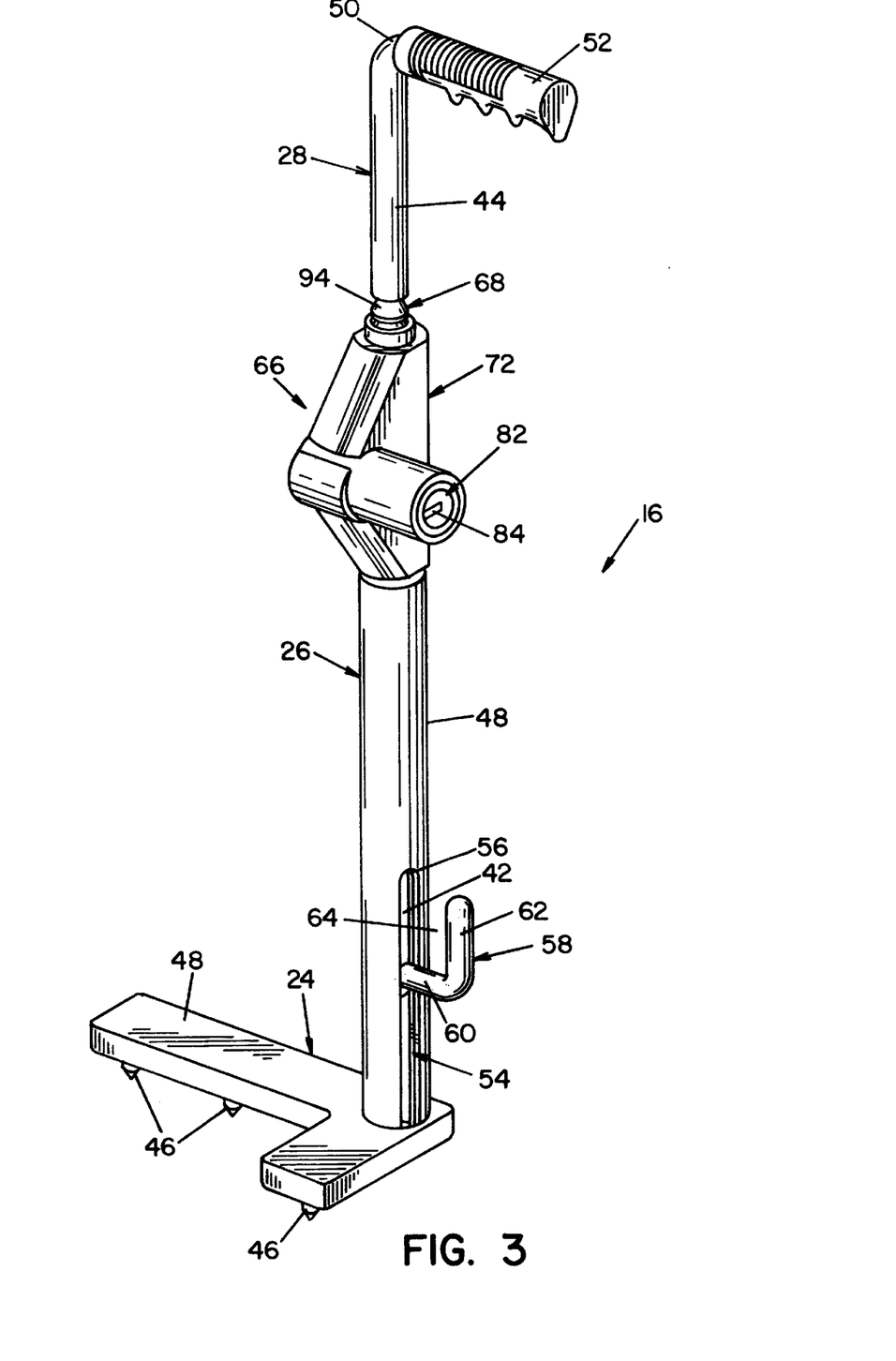
FIG. 3 is a perspective view of the anti-theft device shown in FIG. 1.
Figure 4:
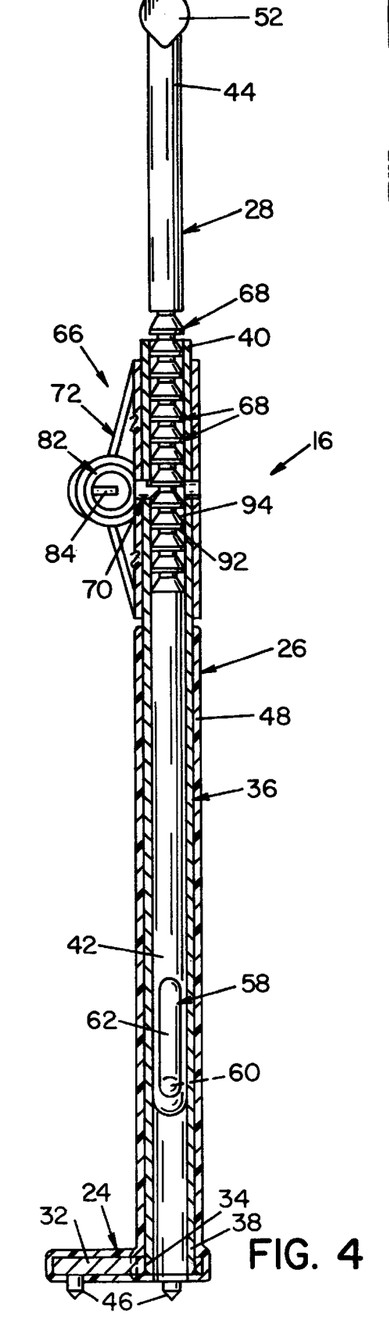
FIG. 4 is a sectional elevation view of the anti-theft device looking in the direction from right to left in FIG. 3.

Referring now in greater detail to the drawings, wherein the showings are for the purpose of illustrating preferred embodiments of the invention only, and not for the purpose of limiting the invention, FIG. 1 illustrates a portion of the interior of a vehicle on the driver's side thereof and which includes an accelerator pedal 10 and a foot pedal 12 which, in accordance with the invention and as described more fully hereinafter, is locked in its retracted position relative to the underlying floorboard 14 by anti-theft device 16. Foot pedal 12 in being next to accelerator 10 is of course the brake pedal for the vehicle and comprises a foot pad 18 mounted on the outer end of a pivotal pedal arm or lever 20 having an underside 22 spaced from the underlying floorboard 14. It will be appreciated that in the absence of anti-theft device 16 being positioned as shown in FIGS. 1 and 2, brake pedal 12 is adapted to be depressed toward floorboard 14 from the position shown in FIGS. 1 and 2 to operate the vehicles brake system and, in some vehicles, such depression of the brake pedal is necessary in order to start and operate the vehicle. While the anti-theft device is shown and described herein in connection with a vehicle brake pedal, it will be appreciated that the device is operable in connection with the clutch pedal of a vehicle having a manual gear shift system.

Referring now in particular to FIGS. 2–7 of the drawing, anti-theft device 16 comprises an L-shaped base 24, a tubular body 26 extending upwardly from the base, and a locking rod 28 axially slidably received in the tubular body and adapted, in the manner and for the purpose set forth more fully hereinafter, to be releasably interengaged with the tubular body by a key operated locking arrangement therebetween. More particularly, base 24 is an L-shaped plate of case hardened steel having a pair of legs 30 and 32 at right angles to one another and provided with a circular opening 34 therethrough at the juncture between the legs. Tubular body 26 comprises a cylindrical sleeve 36 of case hardened steel having a lower end 38 received in opening 34 and attached to base 24 such as by welding. Sleeve 36 has an upper end 40 which is spaced above pedal arm 20 of brake pedal 12 when the anti-theft device is in its mounted position as shown in FIGS. 1 and 2, and locking rod 28 is a circular rod of case hardened steel having an inner end 42 in sleeve 36 and an outer end 44 above upper end 40 of sleeve 36. Preferably, legs 30 and 32 of base 24 are provided on the underside thereof with downwardly extending cleats 46 for the purpose which will become apparent hereinafter, and legs 30 and 32 of the base and a portion of sleeve 36 extending upwardly therefrom are enclosed in a covering 48 of elastomeric material so as to protect adjacent portions of the vehicle from abrasion if engaged by the anti-theft device during mounting and dismounting and when the device is in a storage location in the vehicle. Upper end 44 of locking rod 28 terminates in a laterally extending handle portion 50 which is preferably provided with a hand grip 52 of rubber or the like to facilitate displacement of the locking rod during mounting and dismounting of the anti-theft device as will become apparent hereinafter.

Figure 5:
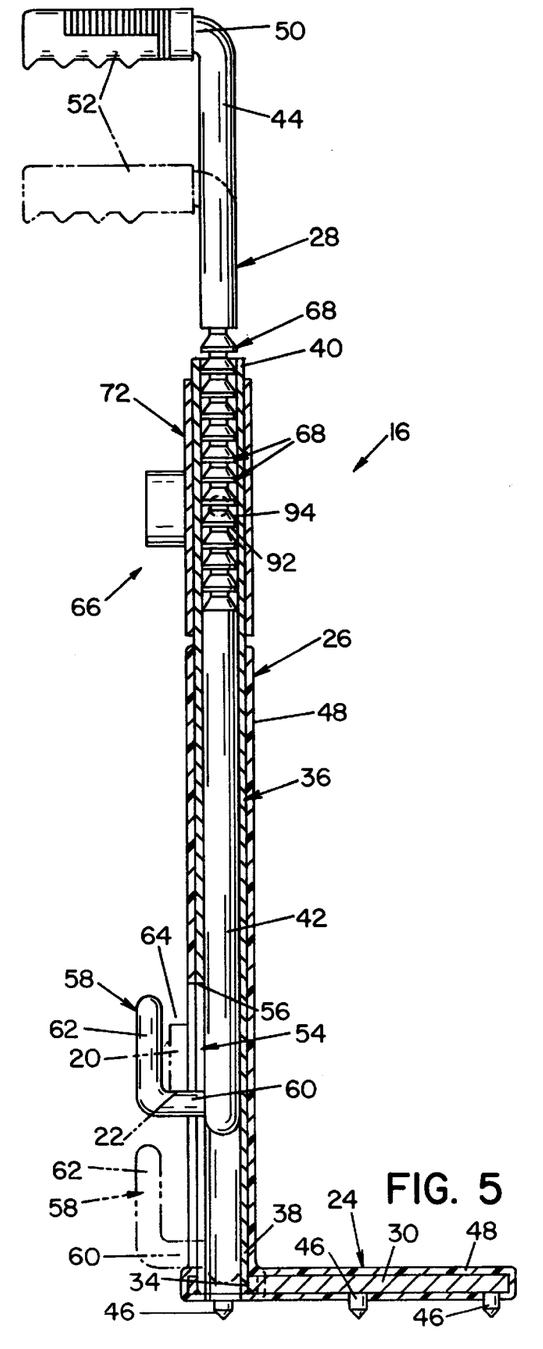
FIG. 5 is a sectional elevation view of the anti-theft device looking in the direction from right to left in FIG. 4.
Figure 6:
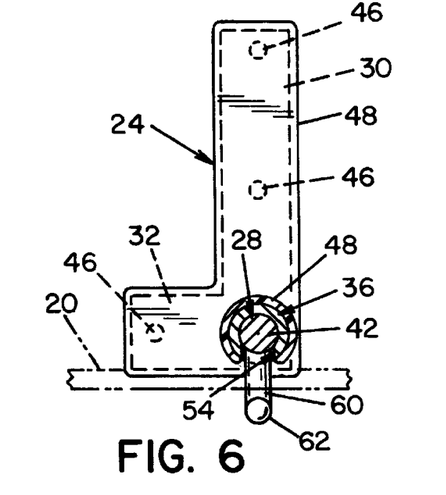
FIG. 6 is a cross-sectional view of the anti-theft device taken along line 6—6 in FIG. 2.
Figure 7:
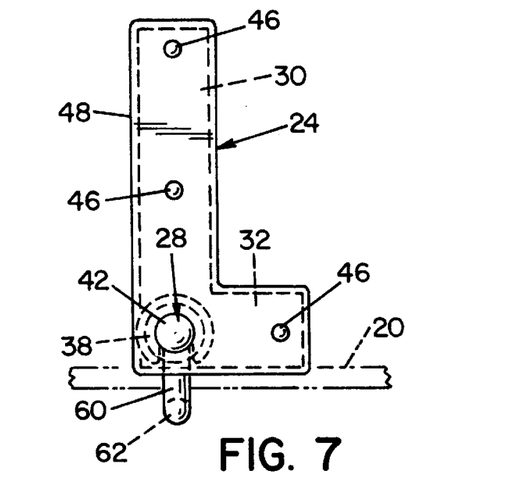
FIG. 7 is a bottom view of the anti-theft device looking along line 7—7 in FIG. 2.

Tubular body 26 includes a slot 54 in sleeve 36 and the overlying portion of covering 48, and the slot extends upwardly from base 24 and has an upper end 56 spaced above the base a distance which assures that the upper end is above the underside 22 of pedal lever 20 when the latter is in its retracted position. Inner end 42 of locking bar 28 is provided with an L-shaped hook component 58 comprising first and second legs 60 and 62, respectively. Leg 60 is secured to locking rod 28, such as by welding, and extends outwardly through slot 54, and second leg 62 extends upwardly from leg 60 parallel to and spaced outwardly from body 26 so as to provide an upwardly open recess 64 for receiving pedal arm 20. As best seen in FIG. 5, locking rod 28 is displaceable between a lower broken line position in which the entrance end of recess 64 is spaced below the underside 22 of pedal lever 20 and an upper solid line position in which the pedal lever is received in recess 64 for leg 60 of hook 58 to engage underside 22 of the pedal lever.

As will be described hereinafter, the locking rod is adapted to be locked in the latter position whereby, as will be appreciated from FIG. 2, leg 60 precludes depression of the foot pedal and pedal lever toward floorboard 14 of the vehicle.

Figure 8:
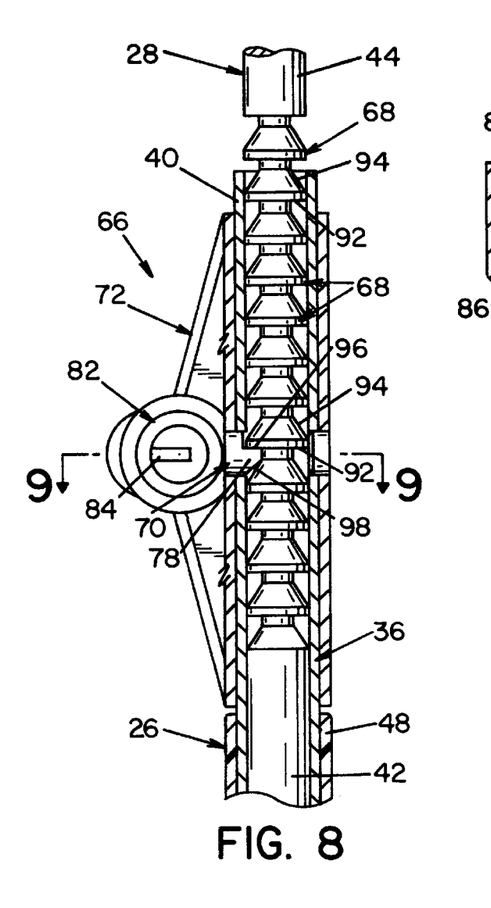
FIG. 8 is an enlarged sectional view of the locking mechanism for the anti-theft device.
Figure 9:
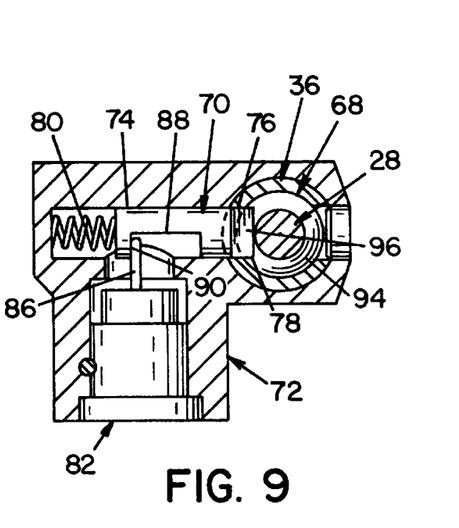
FIG. 9 is a cross-sectional view of the locking mechanism taken along line 9—9 in FIG. 8.

Hook 58 is displaced from the broken line position shown in FIG. 5 to the solid line position shown therein by placing a foot on base 24 to hold the latter against the vehicle floorboard and then grasping hand grip 52 and pulling rod 28 axially outwardly from tubular body 26 to engage the pedal lever in recess 64. Rod member 28 is releasably held in the solid line position shown in FIG. 5 by a ratchet-type locking mechanism 66 which comprises a plurality of keeper elements in the form of ratchet teeth 68 on the rod and a latch member in the form of a pawl 70 in a lock housing 72 mounted on outer end 40 of sleeve 36. As best seen in FIGS. 8 and 9, pawl 70 is reciprocably supported in a bore 74 in housing 72 and an aligned opening 76 in sleeve member 36 and includes a nose portion 78 engaging between adjacent ratchet teeth 68. A coil spring 80 biases pawl 70 for nose 78 thereof to engage between the ratchet teeth, and a key-operated rotatable lock cylinder or tumbler 82 has a key receiving slot 84 and is operable through a blade member 86 on the inner end thereof to displace pawl 70 to the left in FIG. 9 against the bias of spring 80 so as to displace nose 78 from engagement with ratchet teeth 68. More particularly in this respect, pawl 70 is provided with a notch 88 receiving blade 86 and having an outer end 90 biased against blade 86 by spring 80 when pawl 70 is positioned to engage between adjacent ratchet teeth 68. Blade 86 is offset from the axis of tumbler 82, whereby rotation of the tumbler in an unlocking direction through the use of a key inserted in slot 84 displaces blade 86 to the left in FIG. 9 to displace pawl 70 and thus nose 78 to the left to disengage the nose from ratchet teeth 68. This provides an unlocked condition for rod member 28 in which the latter is freely slidable in opposite directions in tubular body 26. In the embodiment illustrated, each of the ratchet teeth 68 includes a flat, radially extending surface 92 and a conical camming surface 94 which, in connection with the corresponding surface 92 extends radially inwardly and axially toward lower end 42 of rod 28. As best seen in FIG. 8, nose 78 of pawl 70 includes a flat surface 96 facing outwardly of rod portion 42 and a camming surface 98 facing inwardly of the rod whereby, when nose 78 is positioned between adjacent ratchet teeth 68, surface 96 facially engages flat surface 92 of one of the ratchet teeth and surface 98 faces camming surface 94 of the adjacent tooth. This advantageously provides a locking position for rod 28 relative to body 26 in which, as will be appreciated from FIGS. 8 and 9, pawl 70 engages a ratchet tooth 68 to lock rod 28 against displacement axially inwardly of sleeve 36 as would be necessary to displace the rod relative to the sleeve to release hook 58 from pedal lever 20 to enable movement of hook 58 from the solid line position to the broken line position thereof shown in FIG. 5. At the same time, it will be appreciated that when rod 28 is in sleeve 36 so as to position hook 58 in the broken line position thereof, camming surface 98 of nose 78 of pawl 70 is positioned to be engaged by conical camming surfaces 94 of successive ratchet teeth 68 when rod 28 is pulled axially outwardly of body 26 from the broken line to the solid line position in which leg 60 of hook 58 engages under pedal lever 20. Thus, pawl 70 is cammed outwardly by each of the cam surfaces 94 against the bias of spring 80 which then displaces the pawl radially inwardly as nose 78 traverses the plane of tooth surface 92. Accordingly, rod 28 can be retracted from body 26 to achieve mounting of the anti-theft device without having to use the key or the lock mechanism, whereby the latter is necessary only to unlock the rod member when it is desired to remove the anti-theft device from its mounted position. This advantageously minimizes the manual manipulations necessary to achieve mounting and dismounting of the device.

Figure 10:
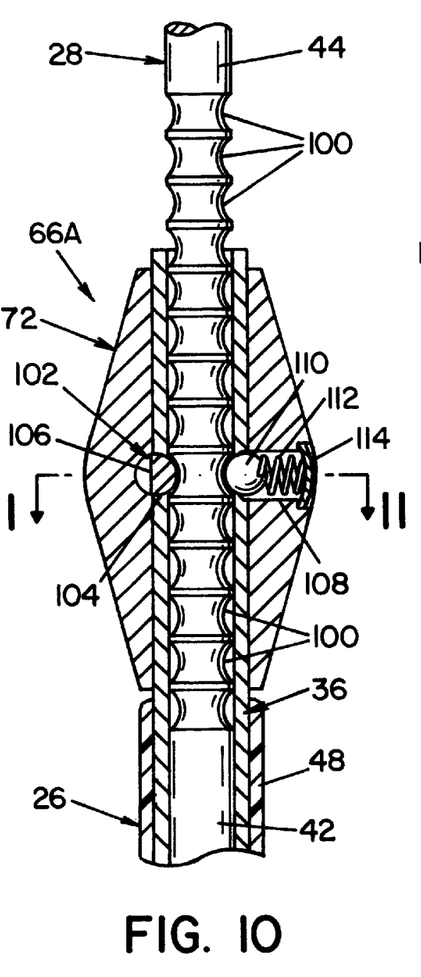
FIG. 10 is an enlarged sectional view of a modified locking arrangement for the anti-theft device.
Figure 11:
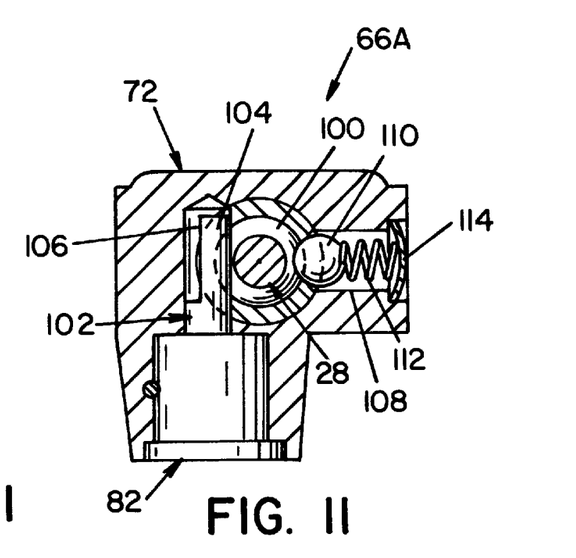
FIG. 11 is a cross-sectional view of the modified lock arrangement taken along line 11—11 in FIG. 10.

FIGS. 10 and 11 illustrate a locking arrangement 66A which is a modification of locking arrangement 66 described above in connection with FIGS. 8 and 9. In this respect, rod 28 in the embodiment of FIGS. 10 and 11 is provided with a plurality of keeper elements in the form of axially adjacent, circumferentially extending semi-circular grooves 100, and key operated tumbler 82 is provided with a rotatable latch member 102 which is circular in cross section and includes an arcuate outer surface portion 104 of a diameter corresponding to the semi-circular grooves 100 and a flat, recessed portion 106. Housing 72 is provided with a bore 108 diametrically opposite latch 102 and bore 108 receives a spherical ball 110 which is biased toward a rod groove 100 by a compression spring 112 captured in bore 108 by a retainer 114. When the locking mechanism is unlocked, as set forth hereinafter, rod 28 is axially slidable in opposite directions in body 26 and, in connection with such sliding, ball 110 is cammed radially outwardly into bore 108 by the portions of rod 28 between adjacent grooves 100 and is adapted to seat in a given groove 100 so as to position the groove for locking engagement with latch 102. Latch 102 is in locking engagement with rod 28 when, as shown in FIG. 10, arcuate outer surface portion 104 of the latch is received in the groove 100 opposite ball 110, whereby axial displacement of rod 28 in either direction is precluded by latch 102. When the latch is rotated 180° from the position shown in FIGS. 10 and 11, arcuate surface portion 104 is disengaged from rod groove 100 and flat 106 is positioned radially outwardly of the rod, whereby the latter is axially displaceable in opposite directions for selective positioning of the rod as provided by ball 110 in the manner described hereinabove. Accordingly, when locking mechanism 66A is incorporated in an anti-theft device in accordance with the invention, it will be appreciated that key operated tumbler 82 is rotated to the unlocked position, whereupon rod 28 is slidable axially inwardly of body 26 to position hook 58 beneath pedal lever 20 after which rod 28 is pulled upwardly by handle 52 for leg 60 of the hook to engage under the pedal lever. Such upward displacement of rod 28 provides for ball 110 to position one of the grooves 100 relative to latch 102, and the rod is then locked in place by rotating tumbler 82 to locked position of the latch.

Figure 12:
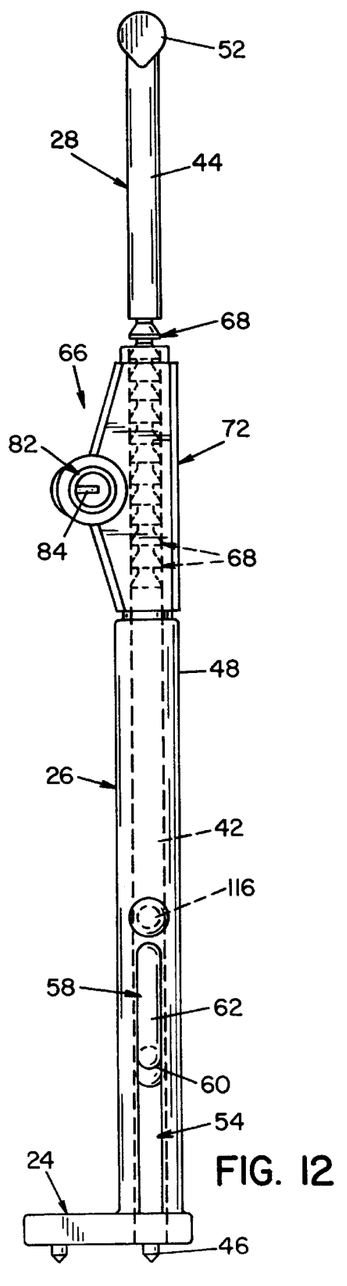
FIG. 12 is an elevation view of a modification of the anti-theft device shown in FIG. 3; and, FIG. 13 is an elevation view, partially in section, of the modified device looking in the direction from right to left in FIG. 12.
Figure 13:
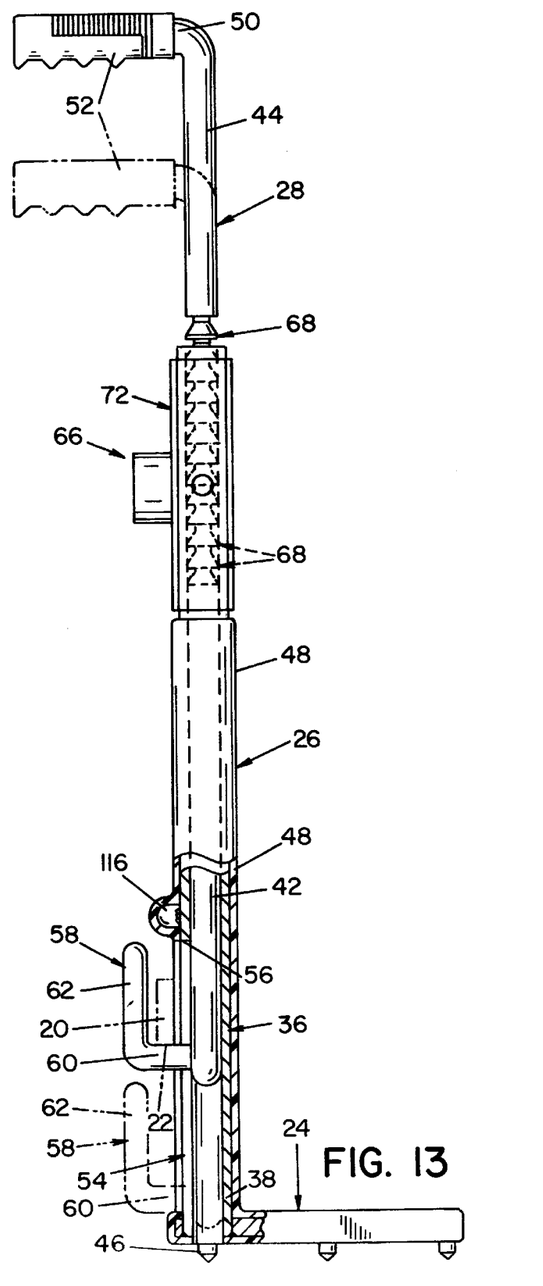

FIGS. 12 and 13 illustrate a modification of tubular body 26 of the anti-theft device described hereinabove and which modification provides a projection which advantageously cooperates with the terminal end of leg 62 of hook 58 to deter removal of the anti-theft device from the pedal lever in the event that the device is dislodged from its fixed position against the floorboard of the vehicle. More particularly in this respect, sleeve 36 of body 26 is provided adjacent the upper end 56 of slot 54 with a radially outwardly extending projection 116, preferably in the form of a nodule of case hardened steel welded on sleeve 36. Nodule 116 extends radially outwardly from sleeve 36 a distance less than that between hook leg 62 and the sleeve and is axially aligned with the hook whereby, as will be appreciated from FIG. 13, it would be difficult if not impossible to remove the anti-theft device from pedal lever 20 in the event that the base of the anti-theft device became dislodged and displaced laterally of its mounted position on the vehicle floorboard.

Mounting of the anti-theft device is simple and is quickly achieved by unlocking rod 29, for displacement inwardly of tubular body 26 to move hook 58 downwardly to its lowermost position relative to base 24, positioning the hook beneath pedal lever 20, placing a foot on base 24 and pulling upwardly on rod 29 to engage hook leg 60 against the underside of pedal lever 20. With the lock mechanism shown in FIGS. 8 and 9, installation is complete upon pulling rod 29 upwardly for hook 58 to engage the pedal lever and, with the lock mechanism shown in FIGS. 10 and 11, installation is complete when the rod is displaced to the latter position and the latch component of the lock tumbler is displaced to the locked position thereof.

While considerable emphasis has been placed herein on the structures and structural interrelationships between the component parts of the preferred embodiments illustrated and described, it will be appreciated that other embodiments of the invention can be made and that many changes can be made in the preferred embodiments without departing from the principles of the invention. Accordingly, it is to be distinctly understood that the foregoing descriptive matter is to be interpreted merely as illustrative of the present invention and not as a limitation.

Having thus described the invention, it is so claimed:

1. An anti-theft device for a vehicle having a foot pedal and pedal arm displaceable toward and away from an underlying floorboard of the vehicle respectively to depressed and released positions relative to the floorboard, said device comprising a base for engaging the floorboard of a vehicle beneath a foot pedal thereof, said base having a pair of legs at an angle to one another, a tubular body extending upwardly from said base and having a lower end attached to the base at the juncture between said pair of legs and having an upper end spaced above the pedal arm, said tubular body having a slot extending therealong from said lower end toward said upper end, a locking rod slidably received in said tubular body and having an inner end in said body and an outer end above said upper end of said body, a hook on said rod having a first leg extending outwardly through said slot and a second leg extending from said first leg parallel to said tubular body and providing an upwardly open recess with said body for receiving the pedal arm, and lock means releasably holding said locking rod in a position relative to said tubular body for said hook to preclude displacement of the foot pedal and pedal arm from the released toward the depressed position thereof, said slot having an upper end and said recess having a width between said body and said second leg, and a projection on said tubular body above said upper end extending outwardly relative to said recess a distance less than said width thereof.

2. An anti-theft device according to claim 1, wherein said projection is a nodule having an inner end fastened to said body.

3. An anti-theft device according to claim 1, wherein said outer end of said locking rod includes a handle portion extending at a right angle thereto, and a hand grip on said handle portion.

4. An anti-theft device for a vehicle having a foot pedal and pedal arm displaceable toward and away from an underlying floorboard of the vehicle respectively to depressed and released positions relative to the floorboard, said device comprising a base for engaging the floorboard of a vehicle beneath a foot pedal thereof, said base having a pair of legs at an angle to one another, a tubular body extending upwardly from said base and having a lower end attached to the base at the juncture between said pair of legs and having an upper end spaced above the pedal arm, said tubular body having a slot extending therealong from said lower end toward said upper end, a locking rod slidably received in said tubular body and having an inner end in said body and an outer end above said upper end of said body, a hook on said rod having a first leg extending outwardly through said slot and a second leg extending from said first leg parallel to said tubular body and providing an upwardly open recess with said body for receiving the pedal arm, and lock means releasably holding said locking rod in a position relative to said tubular body for said hook to preclude displacement of the foot pedal and pedal arm from the released toward the depressed position thereof, said tubular body and said inner end of said locking rod being cylindrical and said first leg of said hook engaging said slot to preclude relative rotation between said body and said locking rod, said slot has an upper end and said recess has a width between said body and said second leg, and a projection on said tubular body above said upper end extending outwardly relative to said recess a distance less than said width thereof.

5. An anti-theft device according to claim 4, wherein said projection is a nodule having an inner end fastened to said body.

6. An anti-theft device for a vehicle having a foot pedal and pedal arm displaceable toward and away from an underlying floorboard of the vehicle respectively to depressed and released positions relative to the floorboard, said device comprising a base for engaging the floorboard of a vehicle beneath a foot pedal thereof, said base having a pair of legs at an angle to one another, a tubular body extending upwardly from said base and having a lower end attached to the base at the juncture between said pair of legs and having an upper end spaced above the pedal arm, said tubular body having a slot extending therealong from said lower end toward said upper end, a locking rod slidably received in said tubular body and having an inner end in said body and an outer end above said upper end of said body, a hook on said rod having a first leg extending outwardly through said slot and a second leg extending from said first leg parallel to said tubular body and providing an upwardly open recess with said body for receiving the pedal arm, and lock means releasably holding said locking rod in a position relative to said tubular body for said hook to preclude displacement of the foot pedal and pedal arm from the released toward the depressed position thereof, said tubular body and said inner end of said locking rod being cylindrical and said first leg of said hook engaging said slot to preclude relative rotation between said body and said locking rod, said lock means including a lock housing on said upper end of said tubular body, a key operated latch member in said housing, adjacent recesses on said locking rod interengaging with said latch member, and a key operated tumbler having locked and unlocked conditions respectively positioning said latch member in a recess and releasing the latch member from the recess, said base being L-shaped and including an opening therethrough at said juncture, and said lower end of said body being received in said opening, said slot having an upper end and said recess having a width between said body and said second leg, and a nodule having an inner end attached to said tubular body above said upper end of said recess and extending outwardly relative to said recess a distance less than said width thereof.

7. An anti-theft device according to claim 6, wherein said outer end of said locking rod includes a handle portion extending at a right angle thereto, a hand grip on said handle portion, said base having top and bottom sides, and a plurality of cleats on said bottom side for engaging the floorboard of a vehicle to restrain displacement of said base relative thereto.

8. An anti-theft device according to claim 7, wherein said base and said tubular body are enclosed in a covering of elastomeric material.

* * * * *

UNITED STATES PATENT AND TRADEMARK OFFICE
CERTIFICATE OF CORRECTION

PATENT NO.   : 6,202,456 B1
DATED        : March 20, 2001
INVENTOR(S)  : Robert V. Vickers It is certified that error appears in the above-identified patent and that said Letters Patent is hereby corrected as shown below:

<u>Column 6,</u>
Line 67, change "29" to -- 28 --.

<u>Column 7,</u>
Line 4, change "29" to -- 28 --;
Line 7, change "29" to -- 28 --.

Signed and Sealed this

Sixteenth Day of October, 2001

*Attest:*

NICHOLAS P. GODICI
*Attesting Officer*   *Acting Director of the United States Patent and Trademark Office*